Patented Nov. 13, 1951

2,574,971

UNITED STATES PATENT OFFICE 2,574,971

HIGHWAY MARKING PAINT CONTAINING GLASS BEADS

Harry Heltzer, St. Paul, Minn., assignor to Minnesota Mining & Manufacturing Company, St. Paul, Minn., a corporation of Delaware No Drawing. Application October 26, 1945, Serial No. 624,947

2 Claims. (Cl. 106—228)

This invention relates to quick-drying highway marking paint adapted to be sprayed on highway surfaces subject to vehicular traffic to provide durable reflex light-reflective traffic markers (such as centerlines) which have a high night-time visibility to motorists. This reflective paint contains brilliantly reflective pigment and also contains admixed transparent glass beads (small glass spheres or sphericles). It makes possible a superior beaded type of highway surface marker and yet involves only a single-step application procedure, the paint and admixed beads being simultaneously coated on the highway surface.

A highway surface marker as thus provided initially has the glass beads buried in the paint film, but the wearing action of vehicular traffic soon causes the upper extremities of the beads to become exposed so that reflex light-reflective properties are obtained and a high night-time visibility to motorists results, the beads functioning as sphere lenses. The beads also serve a mechanical function in improving the durability of the paint film.

Paint compositions for use in marking highways, for example in providing center striping or in delineating pedestrian crossings, are normally required to be quick-setting or quick-drying. When glass beads are applied to the surface of a previously freshly laid coating of such paints, they are frequently ineffectively embedded therein or bonded thereto because of the rapid formation of a hard surface skin on the paint coating, or, at least in the case of very small beads, because of the enormous surface area to be contacted by a relatively small amount of paint. Subsequent pressing of the beads into the paint film may be effective in embedding the beads, but does not aid appreciably in providing adhesion between paint and beads, does not provide uniform distribution of the beads throughout the thickness of the paint film, and furthermore involves still another additional operation in the process of providing the desired markings.

In accordance with the present invention, there is provided a marking paint which may be applied in a single operation to form a wear-resistant coating containing glass beads uniformly dispersed and firmly bonded therein. The paint base is a quick-drying type pigmented with reflective pigments, the glass beads are transparent, and the composition is of a sprayable viscosity.

Transparent glass beads have previously been used in spherulate highway markings and the like, but for such use have invariably been applied in a separate operation to the exposed and still sticky surface of a previously applied paint film. In this connection reference is made to the article "Glass Beads for Road Stripes" published in Public Works, vol. 75, page 18 (November 1944), wherein are mentioned several of the advantages to be obtained from this use of glass beads. See also the U. S. Patent to F. H. Korff, No. 2,043,414, issued June 9, 1936.

In addition to those previously known, I obtain the following advantages by means of my new and novel composition:

1. The paint composition may be applied by simple spray or brush methods now available, without the necessity of modification of existing road-striping equipment of the spray or brush type as used for ordinary paints.
2. The application is complete in a single step.
3. The over-all cost of application is reduced.
4. Improved distribution and bonding of the glass spheres is accomplished.
5. Longer useful life of the coated strip is obtained.
6. Loss of beads during application is avoided.

Contrary to expectation, and in accordance with the advantages above enumerated, I have discovered that the addition of glass beads to fluid paint compositions does not necessarily destroy the sprayability nor the stability of such paint, nor diminish the visibility or wearability of the beads-and-paint coated surface. These unexpected results will be more fully described in connection with the following examples.

Example 1

| Varnish base: | Pounds |
|---|---|
| China-wood oil | 153 |
| Linseed oil | 27 |
| Phenolic base varnish resin ("Amberol M-88," a modified phenolaldehyde resin sold by Resinous Products & Chemicals Corp., was used) | 150 |
| Oleum spirits | 33 |
| V. M. & P. naphtha | 297 |
| Xylol | 8 |
| Cobalt drier, 4% Co | 4.5 |

| Paint composition: | |
|---|---|
| Varnish base | 2734 |
| Titanium dioxide pigment | 1764 |
| Asbestine | 1184 |
| Transparent glass beads | 2340 |
| V. M. & P. naphtha | 280 |

Procedure: In making the varnish base, the drying oils and most of the resin are cooked together until a pill shows a slight draw, i. e. when a drop of the cold mixture is pulled apart, the severed thread shows a slight elasticity or "regain." The balance of the resin is then added for initial cooling. After further cooling, the solvents are added. The cold varnish has a viscosity of G to H on the Gardner-Holdt bubble viscometer.

The pigments are then mixed into the varnish, and the mixture ground to uniformity on a paint mill. The glass beads, drier, and additional solvent are then added and mixed in, for example by means of a pony mixer (a type of mixer having a rotating pan with offset blades). The final composition has a viscosity reading of 80 units as measured on the Krebs modification of the Stormer viscometer, and by calculation contains by volume 25.27% binder, 41.50% solvent, 15.65% pigment, and 17.58% beads. At this value very little settling either of beads or of pigment is encountered even on long standing. For spray application, the composition is preferably diluted with V. M. & P. naphtha just before use to a viscosity reading of 70 units as above defined, measured at the temperature of application. The beaded paint is readily applied in a single operation by means of a spray gun, and dries to a hard long-wearing surface which maintains a high degree of visibility.

In the above composition, the titanium dioxide pigment acts as a brilliant white reflective material, and the asbestine pigment produces a "false body" which is instrumental in preventing or retarding settling. Asbestine is a paint-making grade of talc and is chemically a magnesium silicate. However, even where some settling may have occurred, it is found that the presence of the glass beads increases rather than lessens the ease with which the separated solid materials are redispersed on simple stirring.

In this example the "pigment volume ratio" is 38%. This ratio value is calculated by dividing the volume of pigment (titanium dioxide and asbestine) by the total volume of pigment and non-volatile binder, and multiplying by 100. The volume of the volatile solvent and the volume of the glass beads are not counted in making this calculation.

In a specific formula which has been found to give superior results, the glass bead content of the above composition was made up as follows, in proportions by weight:

| | Percent |
|---|---|
| No. 10 beads, diameter 5.9 mils | 20 |
| No. 12 beads, diameter 4.7 mils | 55 |
| No. 13 beads, diameter 3.9 mils | 25 |

It will be understood that the diameters listed represent an average value only. The No. 10 beads, for example, may include sizes from 9.4 to 4.2 mils diameter, although most of the beads will fall within the limits of 6.6 and 5.2 mils.

The glass used had a density of approximately 2.5 and a refractive index of about 1.5.

The weight of beads added in Example 1 represents approximately 4.4 lbs. of beads per gallon of bead-free paint, which amount increases the total volume of the final paint composition to approximately one and one-fifth gallon. For the size range of beads and the percent of non-volatile binder given, this figure represents an optimum amount. Fewer beads would provide less effective wear-resisting properties and reflectivity of the coated strip. Larger quantities might result in excessive settling, and would require considerable dilution for spray application; and the beads would be less effectively bonded in the dried film. However, as low as about 3 lbs. of transparent beads, or somewhat less, have been found to give excellent wear and effective reflection in the above type of formula; and the addition of as high as about 7.5 lbs. of beads per gallon of paint has not resulted in excessive settling during storage nor in excessive bead loss in the coated strip. On a volume basis, these values approximate from about 12 to about 27 percent of beads and correspondingly from about 26 to about 22 percent of non-volatile binder, i. e. from about one to about two volumes of binder per volume of beads.

The size and density of the beads must also be taken into account in producing stable coatable paint compositions and long-wearing paint films. Excessively large beads cannot be sprayed through the usual paint spray gun. Large beads, or beads of high density, are more inclined to settle out from fluid compositions due to their higher ratio of weight to surface. Large beads are also less firmly bonded in the dried film, and show a greater tendency to scuff loose under the impact of traffic. On the other hand, extremely fine beads have such enormous surface area in relation to their weight that they unduly extend the paint, resulting in thickening of the paint composition, which again requires excessive dilution and results in lowered bonding power. For highway striping paint, especially when it is to be applied by spraying, I prefer to use beads in the size range of about 3 to 10 mils average diameter. Still other sizes are also contemplated for other uses and/or for other application methods.

Where transparent beads are employed for their auto-collimating or reflectorizing effect as well as their resistance to wear, they may be made of glass having any desired refractive index as long as suitable properties of weather-resistance and the like are maintained.

The beads may be surface treated if desired, either to provide improved adhesion between bead and binder, or to provide a colored or reflective or protective surface, or for any other purpose. For example, the glass beads may be coated with an aqueous solution of saligenen (or water-soluble "A Stage" phenol-aldehyde resin) and then dried and heated to produce a thin insoluble organophilic film on each bead; and the coated beads incorporated in the desired paint or varnish. As another example, transparent beads may be coated with a thin layer of pigmented varnish or glaze which is dried or set-up, and the coated beads are incorporated in a centerline paint or varnish. Exposure to traffic then wears away the softer upper surface to expose the hard glass base, which resists further wear. The combination of transparent bead in its reflective partial coating or socket then also produces reflex reflection.

*Example 2*

Varnish base:
    Modified phenolic varnish resin ___lbs__ 100
    Dehydrated castor oil _____gals__ 8
    Linseed oil _____gals__ 8
    V. M. & P. naphtha _____ to 50% of total The varnish base is cooked and diluted according to the method of Example 1.

Pigmented varnish:     Parts by weight
    Titanium dioxide (reflective pigment) __ 95
    Water-ground mica (bodying agent) ___ 5

The pigments are added to the varnish base in an amount sufficient to provide a pigment volume ratio of 40 percent (i. e. 40 volumes of pigment in 60 volumes of non-volatile binder).

Paint composition: To each gallon of pigmented varnish add 6 lbs. of No. 12 transparent glass beads.

Driers may be added if desired, and the composition is thinned to required viscosity before applying.

A centerline of the above composition was applied to a seal coated bituminous highway by spraying in a single operation. Another line was laid according to conventional practice for comparison, using the same pigmented varnish in the same coating weight, but applying the beads in a separate operation. The reflectance of these two lines was measured periodically, and was also compared to that of a plain painted centerline containing no beads. The initial reflectance of the conventional beaded line was quite high, but decreased rapidly. The initial reflectance of the beaded line coated with the composition of my Example 2 was greater than that of the plain painted line but somewhat less than that of the bead-covered paint. However, with exposure of the dried film to the elements and to the action of traffic, it immediately began to increase rapidly in reflectance, and at the end of one month was even more reflective than the similarly exposed bead-covered paint. After one year of exposure the bead-covered paint film had lost a much larger proportion of its beads than the film of my bead-containing paint composition, and was less satisfactory as a centerline stripe than was the latter film. Both films, however, still showed a higher reflectivity than had the plain paint film even when first applied.

*Example 3*

Emulsion type paints, for example the pigmented alkyd resin base water-emulsion type paints now on the market under such trade names as "Kem-Tone," "Resin-Tone," and the like, may be employed as the vehicle for bead-containing paints made according to my invention.

|  | Pounds |
|---|---|
| Air-drying alkyd resin in aqueous emulsion ("S-390" emulsion, containing equal weights of water and air-drying alkyd resin binder, and sold by U. S. Industrial Chemicals Inc., was used) | 1426 |
| Titanium dioxide pigment | 649 |
| Water-ground mica | 117 |
| No. 13 transparent glass beads | 1815 |
| Water | 300 |

Due to the insolubility of asphalt in water, the above type of composition has important advantages over the compositions of Examples 1 and 2 for application as centerline to black-top highways whereon some of the solvent-type paints are frequently found to discolor. The water resistance and durability of emulsion paints, however, is sometimes found to be less than that of the solvent type.

The above composition is seen to contain slightly more than 8 lbs. of beads per gallon of paint. The pigment volume, however, is low. The beads are found to be well anchored in the dried film.

*Example 4*

A fast-drying paint was prepared containing a reflective yellow pigment mixture in a vehicle including a solvent-dispersed but essentially insoluble phenolic resin. The pigment mixture on a weight basis consisted of 17.5% medium chrome yellow, 42.0% light chrome yellow, 10% of a 35%-leaded zinc oxide, 30% asbestine, and 0.5% aluminum stearate. The aluminum stearate was added as a 5% dispersion in a portion of xylol. The pigments, to a pigment volume in the final paint of 42.5%, were ground into a mixture of 25.7 parts by weight of a 20-gallon oil length Congo-linseed oil varnish containing 51% non-volatile, 15.9 parts of xylol, and 31.9 parts of V. M. & P. naphtha. To the resulting base was added 26.25 parts of a 50% dispersion in xylol of a polymerized phenolic resin, and 0.25 parts of cobalt and lead naphthanate driers. The resin dispersion used was "XK-16624" resin, sold by the Bakelite Corporation. There was then added 4 lbs. of No. 13 glass beads to each gallon of the paint mixture, to produce an extremely fast-drying, non-settling bead-containing spreadable paint composition having improved wear resistance in the form of a dried film.

*Example 5*

In this example a spirit varnish was used as the vehicle. It contained 55% non-volatile, consisting of 75% Pontianak resin and 25% castor oil, and 45% solvent, consisting of 90% methanol and 10% butanol. To this varnish was then added a 75% titanium dioxide—25% asbestine pigment mixture to a pigment volume ratio of 40%, followed by 6 lbs. of No. 13 beads per gallon of paint. The bead-containing paint composition thus prepared produced a quick-drying paint line which was more resistant to wear than was a similar line containing no beads. In addition, the paint was easier to apply, and held the beads more firmly, than a two-operation paint line in which loose beads were sprinkled on the pre-laid bead-free paint.

It will be obvious that other paint compositions, binders, solvents, pigments and the like may be substituted for the particular ingredients hereinbefore specified, and such equivalents are herein contemplated. Methods of preparation, and methods of application of my bead-containing compositions may also be varied. For example, where thermoplastic resins or the like are utilized in the binder or vehicle, the solvent or volatile constitutent may be eliminated, and the spreadable mixture of beads and thermoplastic binder may be applied as a melt, which will harden on cooling. Alternatively, for some purposes a temporarily thermoplastic but slowly heat-setting or oxidizing or otherwise reactive solvent-free binder material is contemplated.

The use of colored or uncolored transparent glass sphericles provides the characteristic increased resistance to wear, and, together with the proper reflective pigments, provides the additional and valuable property of reflex reflection, which also continues throughout the entire life of the film. While many different pigments and combinations of pigments may be used with colored or uncolored beads with good results, it is found that certain pigments having high reflective power are most desirable for use in reflective coatings containing transparent beads to produce reflex reflection. For example, lead chromate is better than zinc chromate, which in turn is more effective than ferrite yellow, in providing a yellow reflective beaded paint composition. Pigment volume ratios of 25-45% are found to provide good reflectance without causing chalking of the paint.

The thickness of the applied film may be widely varied depending on the expected use, the permanence desired, and on other conditions. As an example of a satisfactory thickness for use on highway centerlines, paint compositions according to Examples 1 and 2 hereinabove were coated on a concrete highway so as to produce a line 4 inches wide, at the rate of 16 gallons per mile.

Having thus described my invention, what I claim is as follows:

1. A quick-drying reflective highway marking paint essentially comprising a drying-oil-base varnish containing a brilliantly reflective pigment and additionally containing magnesium silicate pigment adapted to provide a false-body, the pigment volume ratio being about 25 to 45%, and a suspended admixture of transparent glass beads having an average diameter of the order of about 3 to about 10 mils and present in the proportion of about 3 to 8 pounds per gallon of bead-free paint, the beaded paint being adapted to be sprayed on highway surfaces subject to vehicular traffic to provide durable reflex light-reflective traffic markers which have a high night-time visibility to motorists.

2. A quick-drying pigmented-varnish reflective highway marking paint adapted to bond to highway surfaces and resist weathering and traffic wear, having a pigment volume ratio of about 25 to 45%, and characterized by containing a suspended admixture of transparent glass beads having an average diameter of the order of about 3 to about 10 mils and present in the proportion about 3 to 8 pounds per gallon of bead-free paint, the beaded paint being adapted to be sprayed on highway surfaces subject to vehicular traffic to provide durable reflex light-reflective traffic markers which have a high night-time visibility to motorists.

HARRY HELTZER.

REFERENCES CITED

The following references are of record in the file of this patent:

UNITED STATES PATENTS

| Number | Name | Date |
|---|---|---|
| 2,133,076 | Bodde | Oct. 11, 1938 |
| 2,268,537 | Shuger | Dec. 20, 1941 |
| 2,294,930 | Palmquist | Sept. 8, 1942 |